US008649952B2

(12) United States Patent
Nedorezov et al.

(10) Patent No.: US 8,649,952 B2
(45) Date of Patent: Feb. 11, 2014

(54) CONTROL OF A BACKING VEHICLE

(75) Inventors: Felix Nedorezov, Rochester Hills, MI (US); Hong Jiang, Birmingham, MI (US); Steven G. Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/495,248

(22) Filed: Jun. 13, 2012

(65) Prior Publication Data

US 2013/0338892 A1 Dec. 19, 2013

(51) Int. Cl.
*B62D 5/30* (2006.01)
*G06F 17/00* (2006.01)

(52) U.S. Cl.
USPC ............ 701/62; 701/42; 701/45; 701/51; 701/60; 701/61; 701/87; 701/88; 701/89; 701/90; 701/95; 701/300; 701/301; 701/302; 903/945; 903/947

(58) Field of Classification Search
USPC ............ 701/42, 45, 51, 60–62, 87–90, 95, 701/300–302; 180/6.66, 204, 404–405; 903/909–919, 945, 947
See application file for complete search history.

(56) References Cited

U.S. PATENT DOCUMENTS

| | | | |
|---|---|---|---|
| 5,680,313 A * | 10/1997 | Whittaker et al. | 701/300 |
| 6,311,116 B1 * | 10/2001 | Lee | 701/70 |
| 6,405,132 B1 * | 6/2002 | Breed et al. | 701/301 |
| 6,674,360 B2 | 1/2004 | Nakamura et al. | |
| 7,027,920 B2 | 4/2006 | Madau | |
| 7,095,336 B2 * | 8/2006 | Rodgers et al. | 340/903 |
| 7,158,015 B2 | 1/2007 | Rao et al. | |
| 7,375,620 B2 | 5/2008 | Balbale et al. | |
| 7,697,698 B2 | 4/2010 | Brown | |
| 7,719,410 B2 | 5/2010 | Labuhn et al. | |
| 7,832,762 B2 * | 11/2010 | Breed | 280/735 |
| 2002/0022927 A1 * | 2/2002 | Lemelson et al. | 701/301 |
| 2002/0105423 A1 * | 8/2002 | Rast | 340/479 |
| 2004/0019426 A1 * | 1/2004 | Knoop et al. | 701/301 |
| 2004/0085197 A1 * | 5/2004 | Watanabe et al. | 340/435 |
| 2004/0117090 A1 * | 6/2004 | Samukawa et al. | 701/45 |
| 2005/0073433 A1 | 4/2005 | Gunderson et al. | |
| 2005/0209762 A1 * | 9/2005 | Lu et al. | 701/70 |
| 2005/0209763 A1 * | 9/2005 | Offerle et al. | 701/83 |
| 2006/0091728 A1 * | 5/2006 | Fulks et al. | 303/193 |
| 2006/0167594 A1 * | 7/2006 | Mah | 701/1 |
| 2006/0220826 A1 * | 10/2006 | Rast | 340/479 |
| 2006/0250297 A1 * | 11/2006 | Prakah-Asante et al. | 342/70 |
| 2007/0219695 A1 * | 9/2007 | Chiu et al. | 701/51 |
| 2007/0228822 A1 * | 10/2007 | Hirata | 303/151 |
| 2007/0233351 A1 * | 10/2007 | Wang | 701/70 |
| 2008/0042410 A1 * | 2/2008 | Breed et al. | 280/735 |
| 2008/0082237 A1 * | 4/2008 | Breed | 701/45 |
| 2009/0157268 A1 | 6/2009 | Chiba et al. | |
| 2011/0015818 A1 * | 1/2011 | Breuer et al. | 701/29 |
| 2012/0245798 A1 * | 9/2012 | Coats et al. | 701/42 |

* cited by examiner

*Primary Examiner* — James Trammell
*Assistant Examiner* — Atul Trivedi
(74) *Attorney, Agent, or Firm* — James Dottavio; MacMillan, Sobanski & Todd, LLC

(57) ABSTRACT

A method for controlling a backing vehicle includes if a back-up sensor indicates that an obstacle is present behind the vehicle and a gear selector is moved to a reverse position, delaying reverse gear engagement and producing a warning signal, and producing a transmission tie-up if brakes are applied insufficiently to stop the vehicle.

16 Claims, 3 Drawing Sheets

CONTROL OF A BACKING VEHICLE

BACKGROUND OF THE INVENTION

1. Field of the Invention

This invention relates generally to a strategy and system for controlling a backing vehicle and producing audible warning signals when potential for personal injury and property damage arises.

2. Description of the Prior Art

Many modern motor vehicles are equipped with back-up assistance systems, wherein the driver is alerted by an audible tone to the presence of an obstacle behind the vehicle. Such systems include one or more sensors mounted on the rear surfaces of the vehicle, which sensors detect presence of the obstacle through ultrasound, radio frequency signal or by other means.

Signals produced by the sensors are relayed to an on-board computer for processing. If an obstacle is detected, the computer generates interface signals, which reduce the volume of an onboard radio and produce warning signals, which are audible to vehicle occupants and preferable have a frequency that is proportional to the proximity of the obstacle.

A deficiency in such systems is that the audible tone is not initiated until the position of the vehicle's gear shift lever is verified to be in the reverse position. If the obstacle is close to the vehicle and the driver causes the vehicle to accelerate rapidly in the reverse direction, system delays, which includes the driver's reaction delay in responding to the warning signal, can lead to the vehicle striking the obstacle.

SUMMARY OF THE INVENTION

A method for controlling a backing vehicle includes if a back-up sensor indicates that an obstacle is present behind the vehicle and a gear selector is moved to a reverse position, delaying reverse gear engagement and producing a warning signal, and producing a transmission tie-up if brakes are applied insufficiently to stop the vehicle. If the brakes are applied sufficiently to stop the vehicle, reverse gear engagement is completed. If the back-up sensor indicates that no obstacle is present behind the vehicle, the tie-up and the warning signal are removed.

The method immediately stops the vehicle by producing rapidly a transmission tie-up, without need for an active braking system and without incurring delay associated with engine control that is limited to producing creep torque in reverse gear.

No additional components, such as solenoids or other mechanisms, are required to restrict the vehicle backward motion in case an obstacle is detected.

The method stops the vehicle movement even after an obstacle appears in the vehicle's path after the reverse gear is selected and the vehicle starts moving in reverse.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
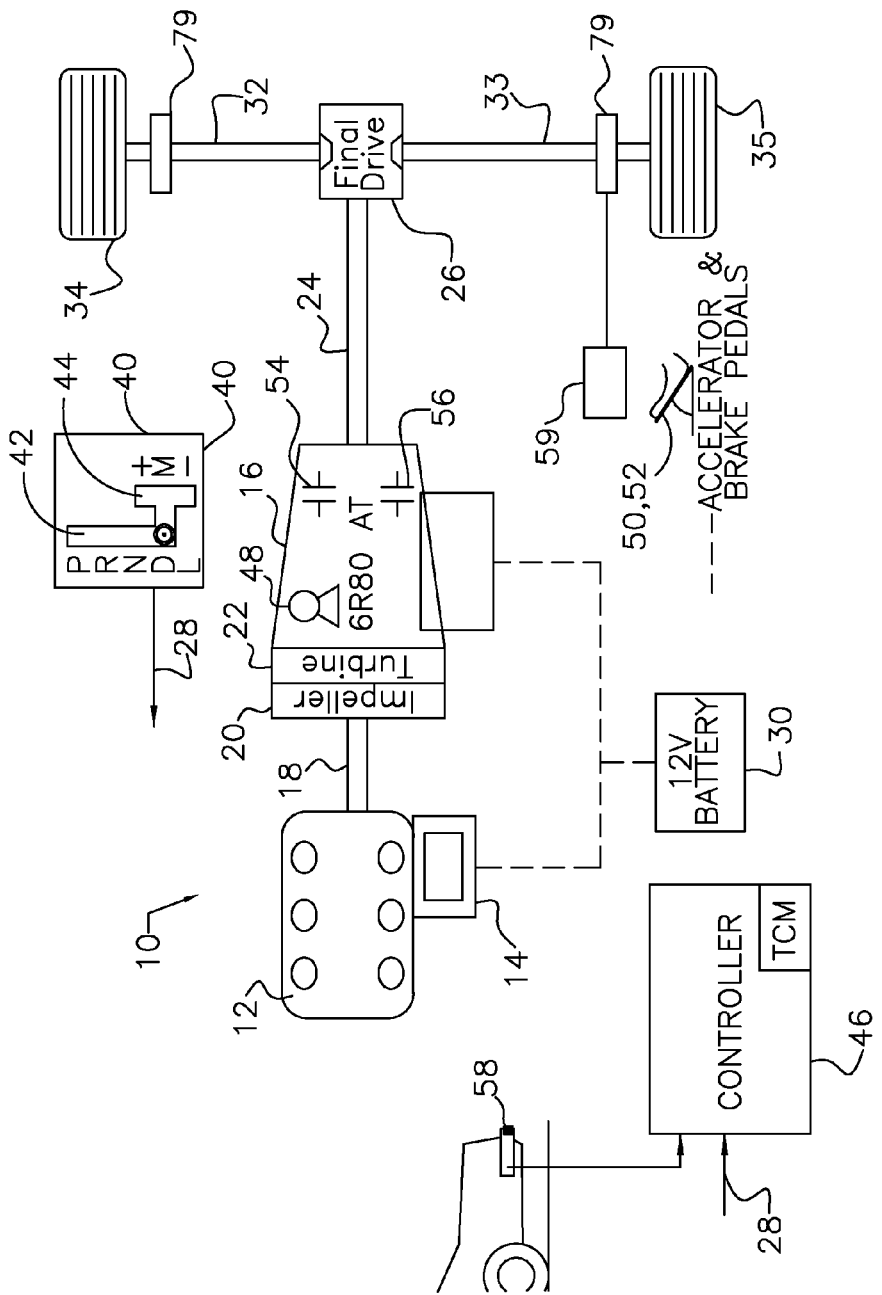
FIG. 1 is a schematic diagram of a motor vehicle powertrain.

The powertrain 10 of FIG. 1 includes a power source 12, such as an internal combustion engine; an engine starter motor 14; automatic transmission 16; input shaft 18; impeller 20, driveably connected by shaft input to the engine; turbine 22, hydrokinetically driven by the impeller; transmission output 24; final drive mechanism 26, connected to the output; an electric storage battery 30, which supplies electric power to starter motor 14; and axle shafts 32, 33, driveably connect to the driven wheels 34, 35 through the transmission output 24 and final drive mechanism 26.

A gear selector 40, which is moved manually by the vehicle operator among P, R, N, D and L positions in an automatic mode channel 42 and between upshift (+) and downshift (−) positions in a manual mode channel 44, produces a PRNDL signal 28 representing the current position of gear selector 40 and received by a controller 46.

Accelerator and brake pedals 50, 52, controlled manually by the vehicle operator, provide input demands to the controller 46 for changes in engine wheel torque and changes in brake force, respectively.

Located within transmission 16 are friction control elements, i.e., clutches and brakes, whose state of coordinated engagement and disengagement produce the forward gears and reverse gear. The reverse gear is produced when at least one, but preferably two of the control elements 54, 56 are engaged concurrently.

Transmission 16 also contains a hydraulic pump, such as a gerotor pump or vane pump, whose output is used to produce pressure in the transmission's hydraulic circuit, through which the transmission control elements 54, 56 are pressurized to a state of full engagement.

A source of service brake pressure 59 produces and maintains pressure in wheel brakes 79.

The microprocessor-based controller 46 communicates through electronic signals transmitted on a communication bus with the engine 12, starter motor 14, transmission 16, gear selector 40, gear shifter 44, and the accelerator and brake pedals 50, 52.

Controller 46 includes a transmission control module (TCM), which produces output signals that control the gears or speed ratios produced by transmission 16 in response to movement of a gear selector 40, vehicle speed and depression of the accelerator pedal 50. The TCM reads the PRNDL position signal 28 produced by gear selector 40 and activates transmission solenoids, which alter the engaged and disengaged state of transmission control elements, i.e., clutches and brakes 54, 56, to produce reverse gear.

Gear engagement is commanded over time to produce acceptable noise, vibration and harshness (NVH) feel to each gear shift. The length of the period during which the gear shift occurs is lengthened if an obstacle in the vehicle's path is detected. Back-up sensors 58 are read by the controller 46 not only when the PRNDL signal 28 indicates that the gear selector 40 is in the R position, but also when the PRNDL signal 28 indicates the selector is in the P position.

Obstacle information is relayed to the TCM. If an obstacle is present the TCM delays the time of reverse gear engagement as compared to normal delay slowing down vehicle motion. The delay may be proportional to the detected obstacle proximity. The closer the obstacle, the longer the delay commanded by the TCU. When reverse gear is already engaged and the vehicle is moving when the obstacle is suddenly detected, the transmission 16 can be controlled to produce a tie-up state, wherein movement of transmission output 24 is restricted, thereby slowing down the vehicle without need for the operator to apply the wheel brakes 79.

The tie-up state can be achieved by closing one of the clutches that is normally open in reverse gear. By applying pressure to that clutch, transmission 16 is placed in the tie-up state. By controlling the amount of pressure is applied to that clutch, a slipping tie-up can be achieved wherein some portion of the input torque is transferred to output shaft 24.

If controller 46 detects that sufficient brake pressure was applied to stop the vehicle, the tie-up can be removed and normal operation in reverse will resume. Alternatively after a calibratable delay, if controller 46 detects that no brake pressure is applied and the operator continues to demand torque, the reverse tie-up can be gradually removed to provide normal vehicle operation. The operator can be prompted to tap the brake to disable transmission intervention if no torque reduction is required while the obstacle is detected.

Figure 2A:
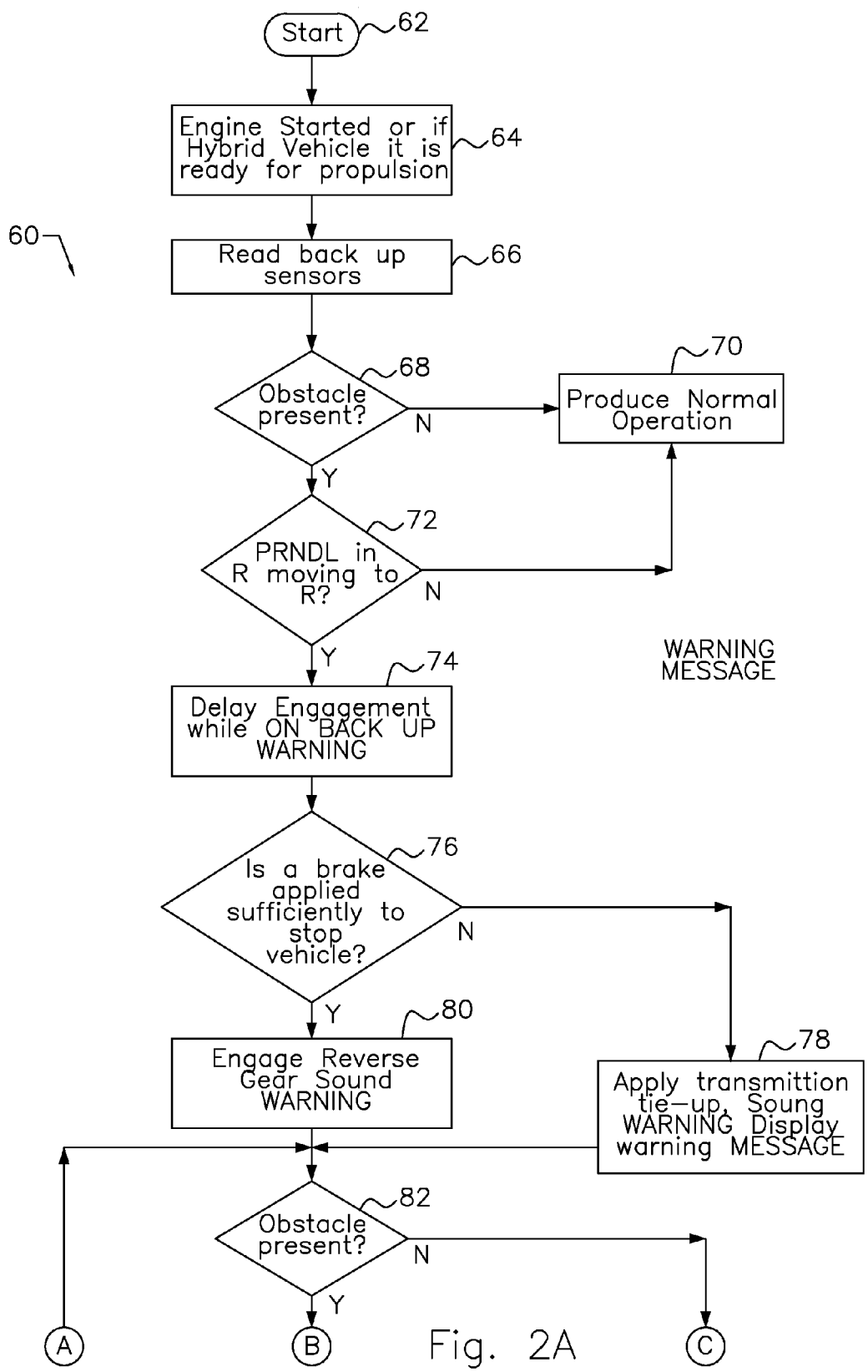
FIGS. 2A and 2B comprise a logic flow diagram of a strategy for controlling a backing vehicle.
Figure 2B:
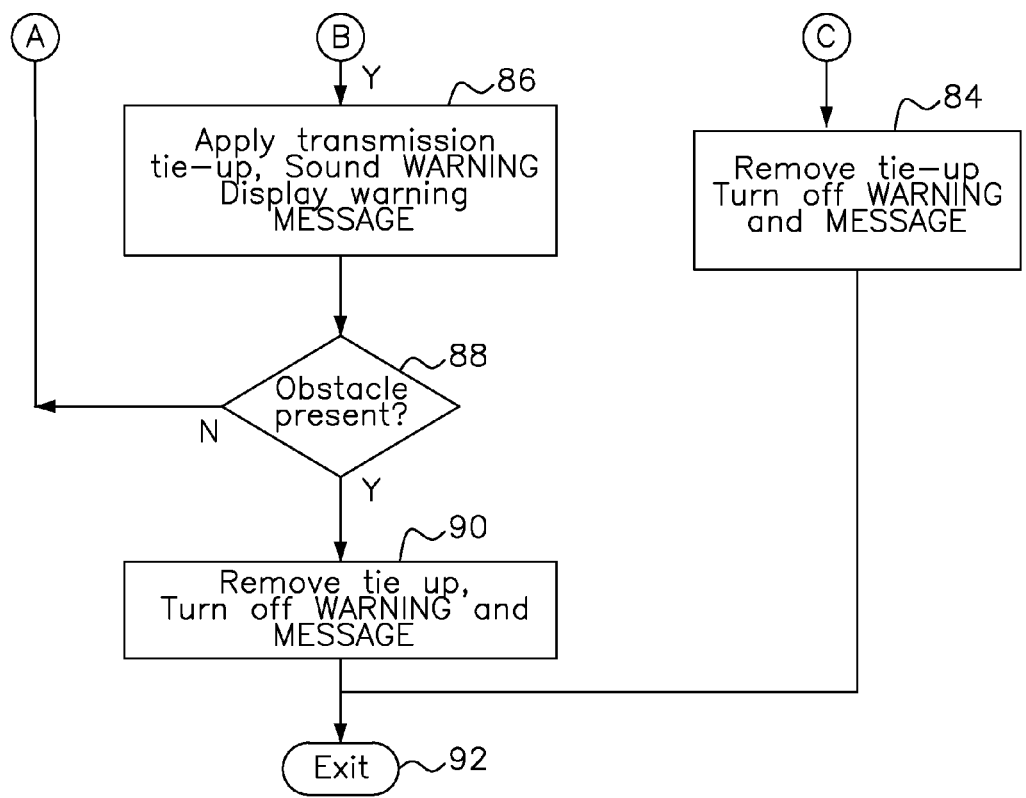

FIGS. 2A and 2B illustrate a strategy 60 for controlling a vehicle while moving in the reverse direction. After the control is entered at step 62, the engine is started or a hybrid electric powertrain is actuated to drive the vehicle wheels step 64.

Output signals produced by the obstacle sensors are read by the controller at step 66.

A test is performed at step 68 to determine whether any of the back-up sensor signals indicate that an obstacle is present at the rear of the vehicle.

If the result of test 68 is logically negative, at step 70 the control permits normal vehicle operation.

But if the result of test 68 is logically positive, a test is made at step 72 to determine from the PRNDL signal 28 produced by the gear selector 40 whether the gear selector is in the R position or moving to the R position, i.e., that the vehicle operator has requested that the transmission produce reverse gear.

If the result of test 72 is negative, at step 70 the control permits normal vehicle operation.

If the result of test 72 is positive, at step 74 engagement of reverse gear is delayed, back-up warning signals audible within and without the vehicle are produced, and an electronic warning message, which may contain a suggested system override sequence, is displayed preferably on a screen visible to the vehicle operator. The warning message should alert the driver as to the reason why the vehicle motion is restricted. For example it could read: "Rear obstacle detected" or "Rear collision avoidance system active."

A test is performed at step 76 to determine whether the vehicle wheel brakes are applied with sufficient brake system pressure to stop the vehicle. In performing step 76, the magnitude of pressure applied to wheel brakes of the vehicle when the brake pedal 52 is depressed indicates whether the resulting wheel brake torque is sufficient to stop the vehicle.

If the result of test 76 is negative, at step 78 the control produces a transmission tie-up, the audible back-up warning signals are produced, and the electronic warning message is displayed on the screen. After executing step 78, the control advances to step 82.

But if the result of test 76 is positive, at step 80 the gear shift to reverse gear is completed and the audible back-up warning signals are produced.

A test is performed at step 82 to determine again whether any of the back-up sensor signals indicate that an obstacle is present at the rear of the vehicle.

If the result of test 82 is negative, at step 84 the control removes the transmission tie-up, the back-up warning audible signals are discontinued, and the electronic warning message is removed from the screen. Thereafter, control advances to step 92

If the result of test 82 is positive, at step 86 the control produces the transmission tie-up, the back-up warning audible signals are produced, and the electronic warning message is displayed on the screen.

A test is performed at step 88 to determine whether a system override has occurred. A system override cancels the result normally produced if any of the back-up sensors indicates that an obstacle is present at the rear of the vehicle. A preferable, suggested override sequence would be required to temporarily disable the system and enable vehicle motion in spite of the fact that an obstacle was detected. As an example, the driver could be instructed to engage one of the transmission controls such as "overdrive cancel" or "tow" push button, momentarily change PRNDL position etc. This is necessary to avoid situations where there is a false trigger, for example tall grass that triggers the system but will not cause any damage if the vehicle moves. Another example of false trigger could be ice or snow covering the back-up sensor.

If the result of test 88 is false, control returns to step 82. But if a system override has occurred, at step 90 the control removes the transmission tie-up, the audible back-up warning signals are discontinued, and the electronic warning message is removed from the screen.

At step 92 the control is exited.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle whose gear selector is in reverse position, comprising:
   (a) after a back-up sensor indicates that an obstacle is present behind the vehicle, delaying reverse gear engagement and producing a warning signal;
   (b) producing a transmission tie-up, provided brakes are applied insufficiently to stop the vehicle;
   (c) completing reverse gear engagement, provided brakes are applied sufficiently to stop the vehicle;
   (d) when the back-up sensor indicates that no obstacle is present behind the vehicle, removing the tie-up and the warning signal.

2. The method of claim 1, wherein step (a) further comprises determining from a signal produced by the back-up sensor that an obstacle is present behind the vehicle.

3. The method of claim 1, wherein step (a) further comprises determining from a signal produced by a sensor that the gear selector is moving to or has been moved to the reverse position.

4. The method of claim 1, wherein producing a warning signal further comprises producing a signal audible within and without the vehicle.

5. The method of claim 1, wherein producing a warning signal further comprises producing a first signal audible within the vehicle and a second signal audible without the vehicle.

6. The method of claim 1, wherein steps (b) and (c) further comprise determining from a magnitude of pressure applied to wheel brakes of the vehicle that said pressure will not produce sufficient wheel brake torque to stop the vehicle.

7. The method of claim 1, wherein completing reverse gear engagement further comprises causing the transmission to operate in a reverse gear without a tie-up.

8. The method of claim 1, further comprising producing a system override that temporarily permits vehicle motion despite detection of the obstacle.

9. A method for controlling a vehicle whose gear selector is in reverse position, comprising:
   after a back-up sensor indicates that an obstacle is present behind the vehicle, delaying reverse gear engagement and producing a warning signal; and
   producing a transmission tie-up, provided if brakes are applied insufficiently to stop the vehicle;
   completing reverse gear engagement, provided brakes are applied sufficiently to stop the vehicle.

10. A system for controlling a backing vehicle, comprising:
    a back-up sensor that produces a first signal indicating whether an obstacle is present behind the vehicle;
    a gear selector moveable among selected gear positions, including a sensor that produces a second signal indicating a current position of the gear selector;
    a displaceable brake pedal;
    wheel brakes supplied with brake pressure in response to displacement of the brake pedal;
    a controller supplied with the first and second signals and configured (i) to delay reverse gear engagement and produce a warning signal after the first signal indicates that an obstacle is present behind the vehicle and the second signal indicates that the gear selector is moved to a reverse position, (ii) to produce a transmission tie-up if the wheel brakes are applied insufficiently to stop the vehicle, and to (iii) complete the reverse gear engagement, if the wheel brakes are applied sufficiently to stop the vehicle.

11. The system of claim 10, wherein the controller is further configured to remove the tie-up and the warning signal if the back-up sensor indicates that no obstacle is present behind the vehicle.

12. The system of claim 10, wherein the controller is further configured to producing a system override that temporarily permits vehicle motion despite detection of the obstacle.

13. The system of claim 10, wherein producing a warning signal further comprises producing a signal audible within and without the vehicle.

14. The system of claim 10, wherein producing a warning signal further comprises producing a first signal audible within the vehicle and a second signal audible without the vehicle.

15. The system of claim 10, wherein the controller determines from a magnitude of pressure applied to wheel brakes that said pressure will not produce sufficient wheel brake torque to stop the vehicle.

16. The system of claim 10, wherein completing reverse gear engagement further comprises causing the transmission to operate in a reverse gear without a tie-up.

* * * * *